United States Patent
Lammens et al.

(10) Patent No.: US 10,570,226 B2
(45) Date of Patent: Feb. 25, 2020

(54) MODIFIER CONTROL IN HIGH PRESSURE POLYETHYLENE PRODUCTION

(71) Applicant: ExxonMobil Chemical Patents Inc., Baytown, TX (US)

(72) Inventors: Henri A. Lammens, Antwerp (BE); Frankie K. R. Verluyten, Hoeselt (BE)

(73) Assignee: ExxonMobil Chemical Patents Inc., Baytown, TX (US)

(*) Notice: Subject to any disclaimer, the term of this patent is extended or adjusted under 35 U.S.C. 154(b) by 66 days.

(21) Appl. No.: 15/751,230

(22) PCT Filed: Jul. 26, 2016

(86) PCT No.: PCT/US2016/044018
§ 371 (c)(1),
(2) Date: Feb. 8, 2018

(87) PCT Pub. No.: WO2017/039877
PCT Pub. Date: Mar. 9, 2017

(65) Prior Publication Data
US 2018/0244813 A1    Aug. 30, 2018

Related U.S. Application Data

(60) Provisional application No. 62/212,377, filed on Aug. 31, 2015.

(30) Foreign Application Priority Data

Oct. 2, 2015   (EP) ...................................... 15188169

(51) Int. Cl.
| | |
|---|---|
| C08F 2/00 | (2006.01) |
| C08F 10/02 | (2006.01) |
| C08F 110/02 | (2006.01) |
| B01J 19/00 | (2006.01) |
| C08F 210/02 | (2006.01) |

(52) U.S. Cl.
CPC ............ C08F 10/02 (2013.01); B01J 19/0006 (2013.01); *B01J 2219/00162* (2013.01); *C08F 210/02* (2013.01); *C08F 2410/01* (2013.01)

(58) Field of Classification Search
CPC .................................. C08F 2/01; C08F 210/00
See application file for complete search history.

(56) References Cited

U.S. PATENT DOCUMENTS

| | | | | |
|---|---|---|---|---|
| 4,558,105 A | * | 12/1985 | Carrick ................. | C08F 210/16 526/68 |
| 6,899,852 B2 | * | 5/2005 | Donck ................. | B01J 19/2415 422/132 |
| 7,582,709 B2 | * | 9/2009 | Goossens ............. | B01J 19/2415 526/64 |

(Continued)

FOREIGN PATENT DOCUMENTS

| | | |
|---|---|---|
| EP | 0144716 A | 6/1985 |
| EP | 2636690 | 9/2013 |

(Continued)

*Primary Examiner* — Rip A Lee
(74) *Attorney, Agent, or Firm* — Kristina M. Okafor; Leandro Arechederra, III

(57) ABSTRACT

Processes and systems for controlling modifier concentration in an ethylene polymerization reactor are disclosed.

16 Claims, 1 Drawing Sheet

(56) References Cited

U.S. PATENT DOCUMENTS

| | | | | |
|---|---|---|---|---|
| 7,852,709 B1* | 12/2010 | Lerro | G01S 15/003 |
| | | | 367/100 |
| 8,859,704 B2* | 10/2014 | Karjala | C08F 10/02 |
| | | | 526/224 |
| 9,221,934 B2* | 12/2015 | Feichtner | C08F 210/02 |
| 9,371,406 B2* | 6/2016 | Cornelissen | B01J 4/008 |
| 9,441,057 B1* | 9/2016 | Littmann | C08F 110/02 |
| 2003/0008982 A1 | 1/2003 | Mahling et al. | |
| 2005/0192414 A1 | 9/2005 | Donck et al. | |
| 2007/0032614 A1 | 2/2007 | Goossens et al. | |
| 2010/0193607 A1* | 8/2010 | Berbee | B01F 5/0451 |
| | | | 239/398 |
| 2011/0301307 A1* | 12/2011 | Littmann | B01J 4/008 |
| | | | 526/64 |
| 2015/0011717 A1* | 1/2015 | Garland, Jr. | C08J 3/124 |
| | | | 526/64 |
| 2017/0121434 A1* | 5/2017 | Van Bodegom | B01J 3/042 |
| 2018/0305476 A1* | 10/2018 | Berbee | C08F 10/02 |

FOREIGN PATENT DOCUMENTS

| | | |
|---|---|---|
| WO | 2011/128147 | 10/2011 |
| WO | 2012/084772 | 6/2012 |
| WO | 2014/046835 | 3/2014 |
| WO | 2015/100351 | 7/2015 |

* cited by examiner

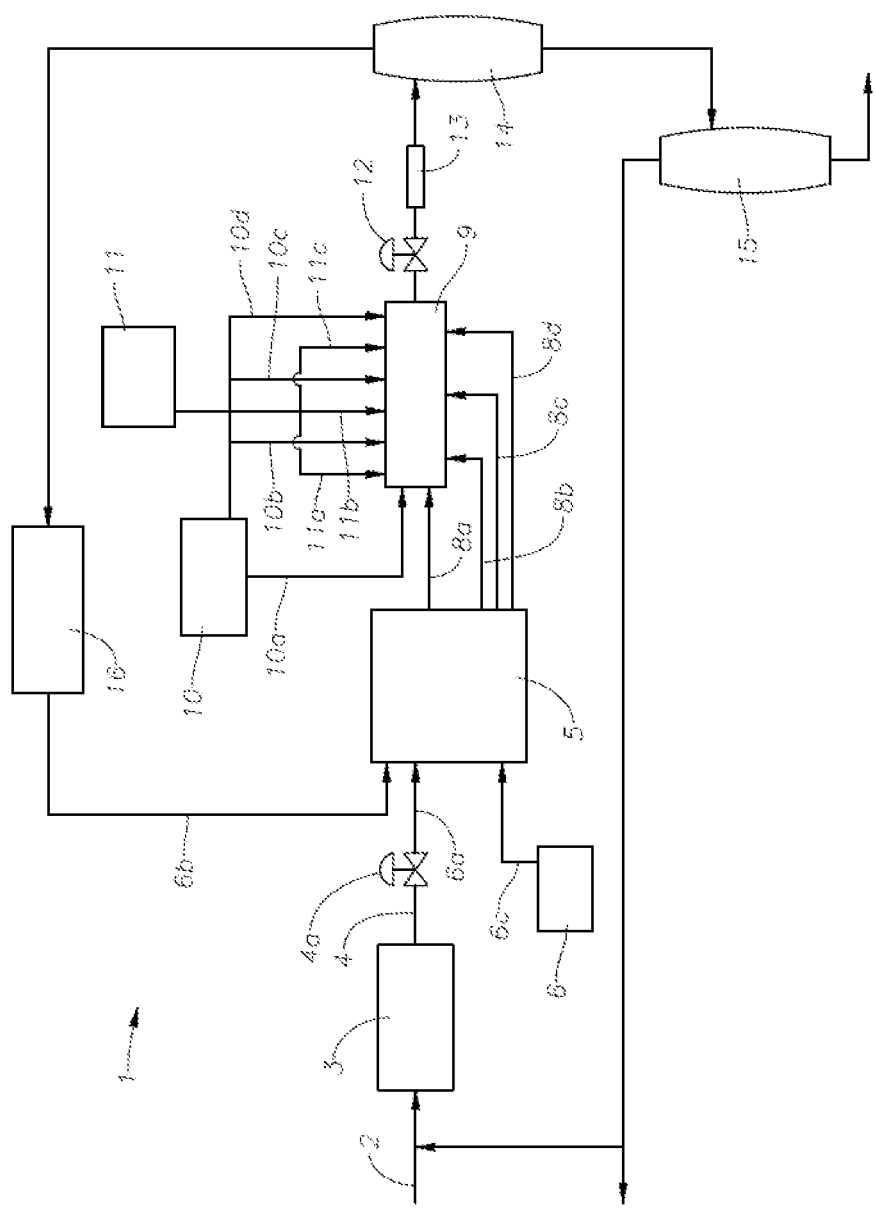

MODIFIER CONTROL IN HIGH PRESSURE POLYETHYLENE PRODUCTION

CROSS REFERENCE OF RELATED APPLICATIONS

The application is a National Phase Application of International Application No. PCT/US2016/044018, filed Jul. 26, 2016, and claims the benefit of U.S. Ser. No. 62/212,377, filed Aug. 31, 2015, and EP 15188169.5, filed Oct. 2, 2015, the disclosures of which are hereby incorporated by reference in their entireties.

FIELD OF THE INVENTION

This invention relates to processes for control of modifiers in the manufacture of polyethylene at high pressure.

BACKGROUND OF THE INVENTION

High pressure reactor polymerization plants convert relatively low cost olefin monomers (generally ethylene, optionally in combination with one or more comonomers such as vinyl acetate) into valuable polyolefin products. Such processes using oxygen or organic free-radical initiators, in particular peroxide initiators, are known in the art and have been used in industry for a long time. The polymerization takes place at relatively high temperatures and pressures and is highly exothermic. The resulting polymer is a low density polyethylene (LDPE), optionally containing comonomers.

High pressure polymerization processes are carried out in autoclave or tubular reactors. In principle, the autoclave and the tubular polymerization processes are very similar, except for the design of the reactor itself. The plants generally use two main compressors arranged in series, each with multiple stages, to compress the monomer feed. A primary compressor provides an initial compression of the monomer feed, and a secondary compressor increases the pressure generated by the primary compressor to the level at which polymerization takes place in the reactor, which is typically about 210 to about 320 MPa for a tubular reactor and about 120 to about 200 MPa for an autoclave reactor.

Modifiers or chain transfer agents are often used in high pressure polymerization processes to reduce the molecular weight and narrow the molecular weight distribution. It is generally known to add modifiers in the suction of the secondary compressor or in the purge of the primary compressor. However, adding modifiers in the secondary compressor can lead to premature thermal polymerization and polymer build-up in the piping of the compressor, which in turn can lead to fouling. Fouling can completely plug gas flow lines in the remainder of the process, which can cause unfavorably high pressure drops, reduced throughput, and poor pumping efficiency in the secondary compressor.

It is also known to add modifier directly to the reactor at a location, but control of modifier concentration within the reactor is challenging and poor control can also lead to fouling. Various methods are known for controlling modifier or chain transfer agent concentration within the reactor. U.S. Pat. No. 6,899,852 discloses a tubular reactor process for obtaining polymers with low haze. The monomer feed streams to the reactor are separated into a transfer agent rich stream and a transfer agent-poor monomer stream, and the transfer agent rich stream is fed upstream of at least one reaction zone receiving the transfer agent-poor monomer stream. The transfer agent-poor monomer stream has 70 wt % or less of the transfer agent relative to the transfer agent rich stream, so as to achieve depletion in the concentration of the chain transfer agent in the downstream reaction zone.

When using a chain transfer agent with a high chain transfer constant in known processes, the residual concentration of transfer agent may be quite low toward the end of the reactor. This can result in production of high molecular weight polymer, causing reduced heat transfer and fouling. Reactor defouls are performed to restore heat transfer so that the process can be operated within the desired temperature window for safety and optimized production rates. Reactor defouls may generally involve removing polymer build-up regularly by mechanical (e.g., hydroblasting or aquadrilling) or chemical (e.g., polymer skin materials) means. Defouls add expense and complexity into the process and create downtime. Other background references include US 2005/192414, WO 2014/046835, WO 2011/128147, WO 2012/084772, WO 2015/100351, and EP 2 636 690 A.

There is a need for processes enabling better control of modifier or chain transfer agent concentration to mitigate fouling and minimize the need for reactor defouls.

SUMMARY OF THE INVENTION

The present invention is directed to a process for controlling modifier concentration in an ethylene polymerization reactor, the process comprising compressing ethylene monomer to a pressure from 1000 to 3000 bar, introducing the compressed ethylene monomer into a reactor, introducing modifier into the front end of the reactor in at least one front stream, and introducing modifier into the side of the reactor in at least three side streams spaced lengthwise along the reactor.

The present invention is also directed to an ethylene polymerization reactor system comprising first and second compressor stages for compressing monomer, a reactor, at least one front stream for introducing modifier into the front end of the reactor, and at least three side streams, spaced lengthwise along the reactor, for introducing modifier into the side of the reactor.

The processes and systems of the invention may be carried out in any suitable reactor system. In a preferred embodiment of the invention, the reactor is a tubular reactor or an autoclave reactor.

BRIEF DESCRIPTION OF THE DRAWINGS

The FIGURE shows schematically an ethylene polymerization plant or system according to an embodiment of the invention.

DETAILED DESCRIPTION OF THE INVENTION

In high pressure polyethylene manufacture, it is generally known to add modifiers in the suction of the secondary compressor or in the primary compressor to act as chain transfer agents and thus control the molecular weight of the ethylene product. However, adding modifiers in the secondary compressor can lead to premature thermal polymerization and fouling within the secondary compressor and intercoolers.

It is also known to add modifier directly to the reactor, but control of modifier concentration within the reactor has been challenging. In a known tubular reactor process, modifier is added in two locations: a front stream at the entry of the reactor and a side stream at the side of the reactor. The amount of modifier in this process is divided equally between the two streams. In another known tubular reactor process, as disclosed in U.S. Pat. No. 6,899,852, the monomer feed streams to the reactor are separated into a transfer agent rich stream and a transfer agent-poor monomer stream, and the transfer agent rich stream is fed upstream of at least one reaction zone receiving the transfer agent-poor monomer stream. In both processes, depletion in the concentration of the modifier in the reaction zone downstream of the modifier entry points occurs. Additionally, the modifier is often depleted at different rates, further contributing to concentration variations along the length of the reactor.

Since modifier is being consumed along the length of the reactor, the residual concentration of modifier in prior processes can become quite low in the reaction zones downstream of the modifier entry points and in the final reaction zone. When a modifier with a high chain transfer activity is used, such as an aldehyde like propionaldehyde or acetaldehyde, this problem is exacerbated because modifiers with high chain transfer activity are depleted more rapidly. When the modifier concentration drops too low, higher molecular weight polymer is formed, which may lead to fouling within the reactor system and polymer product that is off-specification.

The limited number of modifier entry points in prior processes also generally requires that a higher amount of monomer be added at each entry point. This can lead to localized high concentrations of modifier along the length of the reactor. These localized high concentrations can be problematic, especially with saturated modifiers like methane, propane, butane, and others, because they lead to the formation of new short chain molecules that can also result in off-specification product and fouling.

The processes and systems of the present invention enable improved control of modifier concentration across the length of the reactor. Applying modifier injection points to the reactor in at least one front stream and at least three side streams allows the modifier concentration distribution to be more easily tailored. The additional injection points over prior processes also can reduce the amount of modifier that must be added in any one injection point, enabling undesired localized high concentrations of modifier to be avoided.

In the processes and systems of the present invention, the multiple modifier injection locations could be fed by one modifier pump with a flow controller for the various locations, or with separate modifier pumps. Additionally, the modifier could be premixed with a solvent, monomer feed, or initiator prior to adding it to the reactor.

The amount of modifier that is fed to the reactor through each stream can be readily tailored and adjusted, considering the desired process operating parameters and constraints. The at least one front stream may comprise from a low of about 20 wt %, 25 wt %, 30 wt %, 35 wt %, 40 wt %, or 45 wt % to a high of about 30 wt %, 40 wt %, 50 wt %, 60 wt %, 70 wt %, or 80 wt % of modifier, based on the total weight of material fed through the at least one front stream, with suitable ranges including any upper or lower value. Each side stream individually may comprise from a low of about 0.1 wt %, 10 wt %, 20 wt %, 30 wt %, or 40 wt % to a high of about 20 wt %, 30 wt %, 40 wt %, 50 wt %, or 60 wt % of modifier, based on the total weight of material fed through that side stream, with suitable ranges including any upper or lower value. The amount of modifier fed through each side stream individually may differ by less than 15 wt %, 10 wt %, 5 wt %, 3 wt %, 2 wt %, 1 wt %, or 0.5 wt % from the amount fed through each of the other side streams. Additionally, the amount of modifier fed through the at least one front stream may differ by less than 15 wt %, 10 wt %, 5 wt %, 3 wt %, 2 wt %, 1 wt %, or 0.5 wt % from the amount fed through each of the other streams.

The present invention enables better control of modifier concentration within the reactor. The reactor is comprised of at least one reaction zone, and may be comprised of multiple reaction zones. Each reaction zone is optionally followed by a cooling zone. The number and location of modifier injection points along the reactor can be tailored to control modifier concentration with the reaction zones, or within a specific reaction zone. For example, the modifier concentration within any one reaction zone or every reaction zone can be maintained at or above a minimum amount, such as at or above 0.1 wt %, 0.5 wt %, 0.75 wt %, or 1.0 wt %, based on the total weight of material within that reaction zone. Additionally or alternatively, the modifier concentration within the final reaction zone may be maintained at or above 0.1 wt %, 0.5 wt %, 0.75 wt %, or 1.0 wt %, based on the total weight of material within the final reaction zone.

As thermal polymerization rates generally increase in the presence of radicals, radical scavengers may also be used. Radical scavengers can be added to the process through the raw materials and lubrication oils. For example, in processes for making vinyl acetate-based polymers, the vinyl acetate monomer may contain a hydroquinone radical scavenger. The vinyl acetate monomer may contain between 3 and 30 ppm, between 3 and 24 ppm, between 3 and 20 ppm, between 14 and 30 ppm, or between 14 and 24 ppm of hydroquinone. In another example, butylated hydroxytoluene (2,6-di-tert-butyl-4-methylphenol or "BHT"), or other derivatives containing butylated hydroxytoluene units, may be used as a radical scavenger. The BHT may be present in the lubricating oil used on the cylinders of the secondary compressor, and forms a film on the surface of the cylinders that prevents the formation of polymer on these surfaces. The amount of BHT present in the lubricating oil typically ranges from 1000 ppm to about 6 wt %, based on the total amount of lubricating oil. Higher or lower amounts may be selected depending on, among other factors, the activity of the comonomers present in the process stream.

Process for Producing Ethylene Polymer

FIG. 1 is a schematic of a polymerization plant 1 including an ethylene feed line 2 which supplies fresh ethylene to a primary compressor 3. The function of the primary compressor 3 is to pressurize fresh ethylene (make-up ethylene) to the pressure of the ethylene recycle system, for feed to the secondary compressor. The primary compressor may be a single compressor that alone pressurizes the ethylene or it may be two or more compressors in series or in parallel that, in combination, pressurize the ethylene to the pressure of the ethylene recycle system. In some existing ethylene reactor plants, the ethylene discharged from the primary compressor is divided into two streams (not shown), one stream being combined with recycled ethylene and fed to the suction of the secondary compressor, and the other stream being injected into the ethylene/polymer mixture downstream of the high-pressure, let-down valve, thereby providing rapid cooling of the ethylene/polymer mixture prior to entry into the product separation unit.

The ethylene discharged from the primary compressor 3 flows via conduit 4 having a valve 4a to conduit 6a and then to the secondary compressor 5. Recycled ethylene is also supplied to the secondary compressor 5 via conduit 6b from a high pressure recycle system 16. The secondary compressor compresses the ethylene to a pressure of at least 1000 bar for supply to the reactor 9. The secondary compressor 5 is typically a unit driven by a single motor, but may alternatively comprise two or more compressors in series or in parallel driven by separate motors (not shown). Any configuration of compressors is intended to be within the scope of this disclosure as long as said configuration is adapted to compress the ethylene from the pressure of the ethylene as it leaves the primary compressor 3 to the desired reactor pressure in the range of from 1000 bar to 3000 bar.

The secondary compressor 5 discharges compressed ethylene in four streams 8a, 8b, 8c, and 8d. Stream 8a may account for about 20%, about 33%, about 50%, or another amount of the total ethylene flow. Stream 8a may be heated by a steam jacket (not shown) prior to entry into the front end of the reactor 9. The three remaining ethylene side streams 8b, 8c, and 8d each enter the reactor as side streams, and may be cooled prior to entry to the reactor.

The reactor 9 has an initiator pumping station 11 for injecting initiator into the reactor through initiator streams 11a, 11b, and 11c. In a reactor with multiple reaction zones as shown in FIG. 1, each initiator inlet defines the start of a reaction zone. Thus, initiator stream 11a defines the start of the first reaction zone. As initiator is consumed within the reaction zone, the rate of polymerization declines. Further initiator inlets are added downstream to form additional reaction zones. Injection of the initiator causes an exothermic temperature rise downstream of the inlet, which is removed by cooling. The cooling may be effected through the reactor wall via a cooling jacket (not shown) fitted on the reactor 9, and aided by a cooling liquid and/or by a feed of cold monomer downstream. Generally, each inlet of cold monomer defines the end of a reaction zone and the start of a cooling zone. Thus, cooled ethylene side stream 8b defines the start of the first cooling zone. Likewise, initiator stream 11b defines the start of the second reaction zone, and ethylene side stream 8c defines the start of the second cooling zone.

The reactor 9 also has a modifier pumping station 10 for injection of modifier into the reactor through modifier front stream 10a and modifier side streams 10b, 10c, and 10d. The modifier is fed from modifier pumping station 10 via a flow controller (not shown) for tailoring the amount of modifier fed through each stream. In embodiments of the invention, the initiator and modifier could be premixed (not shown) and fed together through the front stream 10a and three side streams 10b, 10c, and 10d, eliminating the need for a separate initiator pumping station 11 and streams 11a, 11b, and 11c. Optionally, fresh modifier could also be supplied to the reactor system from modifier pump 6 via conduit 6c to the discharge or suction of the second stage of the secondary compressor 5.

The tubular reactor terminates at a high-pressure, let-down valve 12. The high-pressure, let-down valve 12 controls the pressure in the tubular reactor 9. Immediately downstream of the high-pressure, let-down valve 12 is product cooler 13. Upon entry to the product cooler 13, the reaction mixture is phase separated. It exits into high pressure separator 14. The overhead gas from the high pressure separator 14 flows into the high pressure recycle system 16 where the unreacted ethylene is cooled and returned to the secondary compressor 5.

The polymer product flows from the bottom of the high pressure separator 14 into the low pressure separator 15, which separates almost all of the remaining ethylene from the polymer. That ethylene is transferred either to a flare (not shown) or a purification unit (not shown), or it is recycled to the primary compressor 3. Molten polymer flows from the bottom of the low pressure separator 15 to downstream processing, which may be, for example, an extruder (not shown) for extrusion, cooling, and pelletizing.

The proportion of the total ethylene which enters the reactor 9, whether in the main feed stream 8a or as a side stream 8b, 8c, or 8d which is converted to polymer before exiting the reactor 9 is referred to as the conversion. In an embodiment of the invention, the conversion may be from 30% to 40% and alternatively at least 35%. Conversions of higher than 40% are feasible but are not preferred, partly because the viscosity of the reaction mixture increases with its polymer content, which leads in turn to an increase in the pressure drop required to maintain the necessary flow velocity. The ethylene polymer product manufactured according to the invention may have a density of from 0.913 to 0.936 g/cm$^3$ (as measured by ASTM D1505) and a melt index of from 0.1 to 20 dg/min (as measured by ASTM D1238). For example, the ethylene polymer obtained from the process according to the invention may have a density of from 0.915 to 0.920 g/cm$^3$ and a melt index of from 2 to 6 dg/min.

The processes herein may be used for the manufacture of ethylene homopolymers and copolymers, such as ethylene-vinyl acetate copolymers. Typically the comonomer(s) will be pressurized and injected into the secondary compressor at one or more points. Other possible comonomers include propylene, 1-butene, iso-butene, 1-hexene, 1-octene, other lower alpha-olefins, methacrylic acid, methyl acrylate, acrylic acid, ethyl acrylate and n-butyl acrylate. Reference herein to "ethylene" should be understood to include ethylene and comonomer mixtures, except where another meaning is implied by context.

Initiators

The term "initiator" as used herein refers to a compound that initiates the free radical ethylene polymerization process. Suitable initiators for use in the present invention include, but are not limited to, organic peroxide initiators. Peroxides are, for example, pure peroxide. Further examples of suitable initiators include peresters including, but not limited to, bis(2 ethylhexyl)peroxydicarbonate, tert-Butyl per(2-ethyl)hexanoate, tert-Butyl perpivalate, tert-Butyl perneodecanoate, tert-Butyl perisobutyrate, tert-Butyl per-3,5,5,-trimethylhexanoate, tert-Butyl perbenzoate, and dialkyl peroxides including, but not limited to, di-tert-butyl peroxide, and mixtures thereof.

The pure peroxides are mixed, typically in a hydrocarbon solvent, and are then injected into the reactor at the injection locations as described herein. Any suitable pump may be used, for example, a hydraulically driven piston pump.

The inventive process may advantageously use from 0.3 kg to 1.5 kg of initiator per tonne of polyethylene polymer produced, and less than 0.7 kg of initiator per tonne of polyethylene.

Modifier

The term "modifier" as used herein refers to a compound added to the process to control the molecular weight and/or melt index of a produced polymer. The term "chain transfer agent" is interchangeable with the term "modifier" as used herein. The modifier may be at least one of tetramethylsilane, cyclopropane, sulfur hexafluoride, methane, t-butanol, perfluoropropane, deuterobenzene, ethane, ethylene oxide, 2,2-dimethylpropane, benzene, dimethyl sulfoxide, vinyl methyl ether, methanol, propane, 2-methyl-3-buten-2-ol, methyl acetate, t-butyl acetate, methyl formate, ethyl acetate, butane, triphenylphosphine, methylamine, methyl benzoate, ethyl benzoate, N,N-diisopropylacetamide, 2,2,4-trimethylpentane, n-hexane, isobutane, dimethoxymethane, ethanol, n-heptane, n-butyl acetate, cyclohexane, methylcyclohexane, 1,2-dichloroethane, acetonitrile, N-ethylacetamide, propylene, n-decane, N,N-diethylacetamide, cyclopentane, acetic anhydride, n-tridecane, n-butyl benzoate, isopropanol, toluene, hydrogen, acetone, 4,4-dimethylpentene-1, trimethylamine, N,N-dimethylacetamide, isobutylene, n-butyl isocyanate, methyl butyrate, n-butylamine, N,N-dimethylformamide, diethyl sulfide, diisobutylene, tetrahydrofuran, 4-methylpentene-1, p-xylene, p-dioxane, trimethylamine, butene-2, 1-bromo-2-chlorethane, octene-1, 2-methylbutene-2, cumene, butene-1, methyl vinyl sulfide, n-butyronitrile, 2-methylbutene-1, ethylbenzene, n-hexadecene, 2-butanone, n-butyl isothiocyanate, methyl 3-cyanopropionate, tri-n-butylamine, 3-methyl-2-butanone, isobutyronitrile, di-n-butylamine, methyl chloroacetate, 3-methylbutene-1, 1,2-dibromoethane, dimethylamine, benzaldehyde, chloroform, 2-ethylhexene-1, propionaldehyde, 1,4 dichlorobutene-2, tri-n-butylphosphine, dimethylphosphine, methyl cyanoacetate, carbon tetrachloride, bromotrichloromethane, di-n-butylphosphine, acetaldehyde, phosphine, and mixtures thereof. Often the modifier is an aldehyde including acetaldehyde, propionaldehyde, butyraldehyde, and mixtures thereof. In an embodiment of the invention, the modifier may be present in the invention in the amount of up to 5 kg per tonne of polyethylene, or from 0.5 to 5 kg per tonne of polyethylene, or from 1 to 5 kg per tonne of polyethylene, or from 2 to 5 kg per tonne of polyethylene, or from 3 to 5 kg per tonne of polyethylene, or from 4 to 5 kg per tonne of polyethylene.

For further details of modifiers, see Advances in Polymer Science, Vol. 7, pp. 386-448, (1970). Table 7 therein ranks several chain transfer agents in order of the chain transfer constant determined under set conditions. Aldehydes, including propionaldehyde and acetaldehyde, are known to have higher chain transfer constants, compared to other chain transfer agents such as propane, butane, isobutane, propene, isobutene, and 1-butene.

The modifier may comprise a $C_2$ to $C_{20}$ or a $C_2$ to $C_{12}$ aldehyde. The modifier may also comprise a $C_2$ to $C_{20}$ or a $C_2$ to $C_{12}$ saturated modifier. Additionally, the modifier may comprise a $C_2$ to $C_{20}$ or a $C_2$ to $C_{12}$ unsaturated modifier.

Certain embodiments and features have been described using a set of numerical upper limits and a set of numerical lower limits. It should be appreciated that ranges from any lower limit to any upper limit are contemplated unless otherwise indicated. Certain lower limits, upper limits, and ranges appear in one or more claims below. All numerical values are "about" or "approximately" the indicated value, and take into account experimental error and variations that would be expected by a person having ordinary skill in the art.

To the extent a term used in a claim is not defined above, it should be given the broadest definition persons in the pertinent art have given that term as reflected in at least one printed publication or issued patent. Furthermore, all patents, test procedures, and other documents cited in this application are fully incorporated by reference to the extent such disclosure is not inconsistent with this application and for all jurisdictions in which such incorporation is permitted.

While the foregoing is directed to embodiments of the present invention, other and further embodiments of the invention may be devised without departing from the basic scope thereof, and the scope thereof is determined by the claims that follow.

What is claimed is:
1. A process for controlling modifier concentration in an ethylene polymerization reactor, the process comprising:
   compressing ethylene monomer to a pressure from 1000 to 3000 bar;
   introducing compressed ethylene monomer into a reactor;
   introducing modifier into a front end of the reactor in at least one front stream;
   introducing modifier into a side of the reactor in at least three side streams spaced lengthwise along the reactor; and
   introducing an initiator into the reactor;
   wherein the initiator and modifier are premixed prior to adding them to the reactor.

2. The process of claim 1, wherein the at least one front stream comprises about 20 wt % to 80 wt % of modifier, based on the total weight of material fed through the at least one front stream.

3. The process of claim 1, wherein each side stream individually comprises about 0.1 wt % to 60 wt % of modifier, based on the total weight of material fed through that side stream.

4. The process of claim 1, wherein an amount of modifier fed through each side stream individually differs by less than 5 wt % from the amount of modifier fed through each of the other side streams individually.

5. The process of claim 1, wherein the reactor is comprised of multiple reaction zones spaced lengthwise along the reactor, and a modifier concentration in a final reaction zone is maintained at or above 0.1 wt %, based on the total weight of material in the final reaction zone.

6. The process of claim 1, wherein the reactor is comprised of multiple reaction zones spaced lengthwise along the reactor, and a modifier concentration in each reaction zone is maintained at or above 0.1 wt %, based on the total weight of material in that reaction zone.

7. The process of claim 1, wherein the modifier is at least one selected from the group consisting of tetramethylsilane, cyclopropane, sulfur hexafluoride, methane, t-butanol, perfluoropropane, deuterobenzene, ethane, ethylene oxide, 2,2-dimethylpropane, benzene, dimethyl sulfoxide, vinyl methyl ether, methanol, propane, 2-methyl-3-buten-2-ol, methyl acetate, t-butyl acetate, methyl formate, ethyl acetate, butane, triphenylphosphine, methylamine, methyl benzoate, ethyl benzoate, N,N-diisopropylacetamide, 2,2,4-trimethylpentane, n-hexane, isobutane, dimethoxymethane, ethanol, n-heptane, n-butyl acetate, cyclohexane, methylcyclohexane, 1,2-dichloroethane, acetonitrile, N-ethylacetamide, propylene, n-decane, N,N-diethylacetamide, cyclopentane, acetic anhydride, n-tridecane, n-butyl benzoate, isopropanol, toluene, hydrogen, acetone, 4,4-dimethylpentene-1, trimethylamine, N,N-dimethylacetamide, isobutylene, n-butyl isocyanate, methyl butyrate, n-butylamine, N,N-dimethylformamide, diethyl sulfide, diisobutylene, tetrahydrofuran, 4-methylpentene-1, p-xylene, p-dioxane, trimethylamine, butene-2, 1-bromo-2-chlorethane, octene-1, 2-methylbutene-2, cumene, butene-1, methyl vinyl sulfide, n-butyronitrile, 2-methylbutene-1, ethylbenzene, n-hexadecene, 2-butanone, n-butyl isothiocyanate, methyl 3-cyanopropionate, tri-n-butylamine, 3-methyl-2-butanone, isobutyronitrile, di-n-butylamine, methyl chloroacetate, 3-methylbutene-1, 1,2-dibromoethane, dimethylamine, benzaldehyde, chloroform, 2-ethylhexene-1, propionaldehyde, 1,4 dichlorobutene-2, tri-n-butylphosphine, dimethylphosphine, methyl cyanoacetate, carbon tetrachloride, bromotrichloromethane, di-n-butylphosphine, acetaldehyde, phosphine, and mixtures thereof.

8. The process of claim 1, wherein the modifier is at least one selected from the group consisting of acetaldehyde, propionaldehyde, butyraldehyde, and mixtures thereof.

9. The process of claim 1, wherein the modifier has a chain transfer constant determined at 1360 atm and 130° C. of 0.2 or greater.

10. The process of claim 1, wherein the modifier has a chain transfer constant determined at 1360 atm and 130° C. of less than 0.2.

11. The process of claim 1, wherein the initiator comprises an organic peroxide.

12. The process of claim 1, wherein an amount of initiator used is 0.3 kg to 1.5 kg per tonne of polyethylene polymer produced.

13. The process of claim 1, wherein an amount of initiator used is at or less than 0.7 kg per tonne of polyethylene polymer produced.

14. The process of claim 1, wherein the reactor comprises a tubular reactor or an autoclave reactor.

15. The process of claim 1, wherein an ethylene polymer is recovered from the reactor and the ethylene polymer has a melt index of from about 0.1 to 3 dg/min and a density of from 0.913 g/cm$^3$ to 0.936 g/cm$^3$.

16. The process of claim 1, wherein an ethylene polymer is recovered from the reactor and the ethylene polymer is used in a film application.

* * * * *